United States Patent
LaVoie et al.

(10) Patent No.: US 7,155,571 B2
(45) Date of Patent: Dec. 26, 2006

(54) N-SOURCE IN-KERNEL CACHE FOR HIGH PERFORMANCE IN COMPUTER OPERATING SYSTEMS

(75) Inventors: Jason D. LaVoie, Mahopac, NY (US); John M. Tracey, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/260,803

(22) Filed: Sep. 30, 2002

(65) Prior Publication Data

US 2004/0064819 A1    Apr. 1, 2004

(51) Int. Cl.
*G06F 12/00* (2006.01)
*G06F 7/00* (2006.01)
*G06F 17/30* (2006.01)

(52) U.S. Cl. ............... 711/118; 711/100; 718/104; 718/100; 707/3

(58) Field of Classification Search ........ 718/100–108; 711/100–173, 200–221; 707/1–10, 100–104.1, 707/200–206
See application file for complete search history.

(56) References Cited

U.S. PATENT DOCUMENTS

| | | | | |
|---|---|---|---|---|
| 5,396,614 A * | 3/1995 | Khalidi et al. | ............ | 711/118 |
| 5,530,799 A * | 6/1996 | Marsh et al. | ............ | 345/557 |
| 5,608,909 A * | 3/1997 | Atkinson et al. | ............ | 719/315 |
| 5,613,124 A * | 3/1997 | Atkinson et al. | ............ | 345/557 |
| 5,729,710 A * | 3/1998 | Magee et al. | ............ | 711/203 |
| 5,771,383 A * | 6/1998 | Magee et al. | ............ | 719/312 |
| 6,163,812 A | 12/2000 | Gopal et al. | | |
| 6,304,879 B1 * | 10/2001 | Sobeski et al. | ......... | 707/103 R |
| 6,542,967 B1 * | 4/2003 | Major | ............ | 711/134 |

OTHER PUBLICATIONS

Bonwick, Jeff. "The Slab Allocator: An Object-Caching Kernel Memory Allocator", USENIX Summer 1994 Technical Conference (1994).*
Bonwick, J., The Slab Allocator: An Object-Caching Kernel Memory Allocator, USENIX Summer 1999 Technical Conference.
Vilayannur, M., et al., Kernel-Level Caching for Optimizing I/O by Exploiting Inter-Application Data Sharing.

* cited by examiner

*Primary Examiner*—Lewis A. Bullock, Jr.
(74) *Attorney, Agent, or Firm*—Ference & Associates (57) ABSTRACT

An application independent, in-kernel cache is implemented. In-kernel caches provide applications with commonly used data quickly and efficiently. Methods and instruments for storing content, cache objects, are implemented leveraging operating system supplied mechanisms. Every operating system has one or more specific means of in-kernel storage usable by kernel extensions. A system that acquires storage for the cache objects is implemented. Techniques for allowing multiple varying sources of data are defined. Multiple data sources may provide application specific and/or application independent data using various protocols. The aforementioned cache object storage mechanisms are independent of the source of the data and vise versa. Techniques for fast lookup and management of cache objects are defined. Mechanisms for moving the data from the data source into the cache object storage mechanism are implemented.

45 Claims, 10 Drawing Sheets

N-SOURCE IN-KERNEL CACHE FOR HIGH PERFORMANCE IN COMPUTER OPERATING SYSTEMS

FIELD OF THE INVENTION

The present invention relates generally to operating systems and, more specifically, to the caching of application data inside an operating system kernel environment.

BACKGROUND OF THE INVENTION

Caching is found in many areas of computer science, wholly consistent with the dictionary definition of "a safe place of hiding or storing things" (see, e.g., in *Webster's New World Dictionary of the American,* 2nd college ed. 1976). Processors can have many levels of caches (see Hennessy, John and David A Patterson, *Computer Architecture A Quantitative Approach* 2nd ed. San Francisco: Morgan Kaufmann, 1996, p. 375), while some file systems can also have caches (see Solomon, David and Mark Russinovich, *Inside Microsoft Windows* 2000 3rd ed. Redmond: Microsoft Press, 2000, p. 646). Applications, such as HTTP servers (Fielding, R., et al., *RFC* 2068, 1997, p. 70, http colon backslash backslash www dot ietf dot org backslash rf backslash rfc2068 dot txt), may have them as well. Further examples abound. Some applications even have application specific caches in the operating system kernel (Hu, Elbert, et al., "Adaptive Fast Path Architecture", IBM Journal of Research and Development, March 2001, p. 191–206). The term "kernel" is commonly understood to refer to that portion of the operating system that operates in privileged mode; it is the essential part of an operating system that performs basic functions and services.

However, to date there has not been known to exist any universal operating system kernel environment cache that is independent of the source of the data. A need has thus been recognized in connection with overcoming such a shortcoming.

SUMMARY OF THE INVENTION

There is broadly contemplated, in accordance with at least one presently preferred embodiment of the present invention, a universal operating system kernel cache capable of caching both application specific and application independent data and delivering such data via essentially any application protocol. Data may come from a variety of sources and may be stored in the kernel cache using numerous kernel specific mechanisms. Systems for managing the cache are also broadly contemplated herein.

In summary, the present invention provides, in one aspect, a system for caching application data in the kernel environment of an operating system, the system comprising: an arrangement for creating at least one cache object for storing cached content in the kernel environment; at least one arrangement for looking up at least one cache object; and an arrangement for collecting data from plurality of data sources and populating at least one cache object with the collected data.

In another aspect, the present invention provides a method of caching application data in the kernel environment of an operating system, the method comprising the steps of: creating at least one cache object for storing cached content in the kernel environment; looking up at least one cache object; and collecting data from plurality of data sources and populating at least one cache object with the collected data.

Furthermore, in an additional aspect, the present invention provides a program storage device readable by machine, tangibly embodying a program of instructions executable by the machine to perform method steps for caching application data in the kernel environment of an operating system, the method comprising the steps of: creating at least one cache object for storing cached content in the kernel environment; looking up at least one cache object; and collecting data from plurality of data sources and populating at least one cache object with the collected data.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Generally, at least one presently preferred embodiment of the present invention relates to a kernel run-time environment for authoring high performance network servers. One aspect of the present invention relates to an N-source In-kernel Cache (NICache). NICache makes it possible for one or more applications to extend the operating system for high performance. The application discussed here which is enhanced with NICache is Adaptive Fast Path Architecture (AFPA). AFPA is an in-kernel network server accelerator that serves data from many disparate sources. It should be understood that NICache is not a stand-alone application; it must be employed by one or more applications.

The following are detailed definitions of some useful terms utilized herein.

A "callback function" may be understood as a reference to discrete code, that is, functions that are specified and called at a later time when desirable. This technique is often employed by programmers who wish for a function to be called as a result of an event or wish not for functions to be called synchronously. For example, a signal handler executes a function written by a programmer when a signal occurs.

A "hash table" may be understood as a data structure used by programmers to store data. Hash tables provide fast direct addressing of elements in a table, without having to use a storage mechanism large enough to store K elements of a set. Hash tables apply a function, typically called a hash function, to each data element to determine the index into a table. Hash tables are usually fixed in length.

A "linked list" may be understood as a data structure used by programmers to store data. Linked lists store data linearly, typically with access to the front or rear of the list. Linked lists are not fixed in length and are easily grown. The amount of time required to search a linked list generally grows linearly with the number of items in the list.

Figure 1:
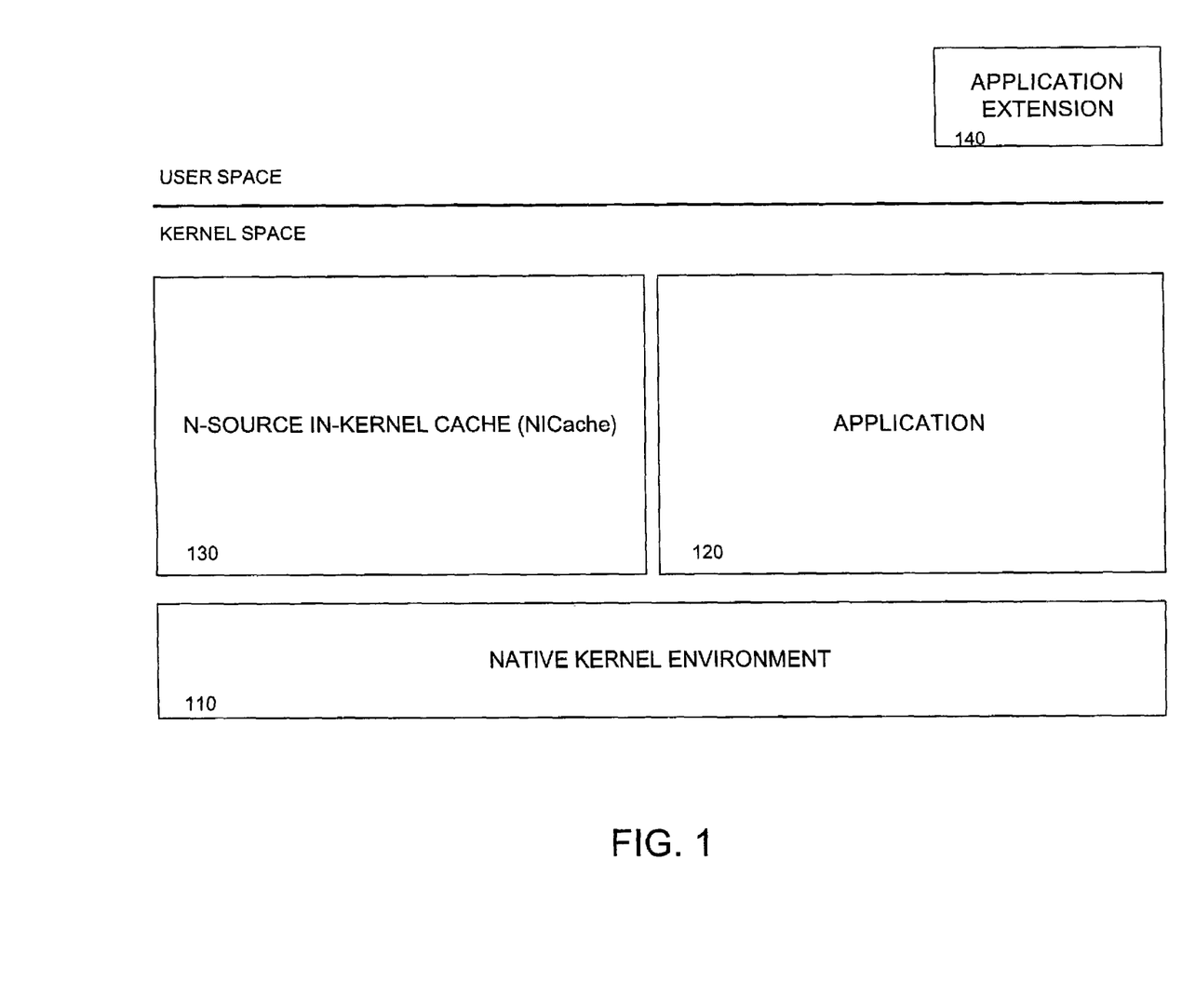
FIG. 1 is a block diagram illustrating a runtime environment.

Turning now to a description of preferred embodiments of the present invention, a native kernel environment 110 as illustrated in FIG. 1 may include address space, execution context, security attributes, etc. of an operating system which are typically hidden from user level applications. The native kernel environment will implement services exposed to applications in user space and may provide services for writing kernel extensions.

The term "native", used as a modifier to "kernel environment," refers to a particular kernel environment. For instance the AIX, Linux, and Windows operating systems all have distinct native kernel environments. They are distinct because they each have a specific set of application program interfaces (APIs) for writing subsystems (such as network adapter drivers, video drivers, or kernel extensions). Windows provides hundreds of APIs within its native kernel environment. AIX and Linux each have different APIs. Furthermore, the environments among these operating systems differ in how the file system and TCP/IP subsystems interact.

N-source In-kernel Cache (NICache) 130 makes use of these APIs as a kernel extension. Typically, NICache is used with or within one or more applications 120. An application, whatever its purpose, also runs in the native kernel environment 110. In a preferred embodiment of the present invention, an HTTP server accelerator is the application, with NICache linked with the application. That is, NICache cannot be executed outside of the application as a standalone executable unit. The application itself may have more then one execution unit, including an extension running in user space. The application extension 140 preferably does not run in the native kernel environment but in user space.

The application extension 140 could be part of an HTTP server that generates dynamic content based on the HTTP request received. It is useful for applications to separate servers into kernel and user components. This approach allows the server writer to pick and choose what pieces of the server need to be in user space and what pieces need to be in the kernel. For example, HTTP servers invariably want to run client Common Gateway Interface (CGI) requests at user space and not in the kernel, because CGIs require user space protection.

In a preferred embodiment of the present invention, the application handles HTTP requests including GET, HEAD, and POST requests. If a response resides in the cache, then the request is serviced from the kernel. However, if the HTTP request is a request for dynamic content (e.g., a CGI request), then it is deferred to the application extension 140 for processing. The application extension executes any part of the request requiring a user space execution context.

NICache 130 provides an API to its accompanying application 120. All calls into this API are funneled through the cache object manager 210 (see FIG. 2). Continuing with FIG. 2, the cache object manager 210 proxies preferably every call into NICache and manages all of the internal components and logic. To perform its duties optimally, the cache object manager may query 260 the state of the hardware of the machine such as physical memory utilization or CPU utilization. It may also inquire 260 as to the state of the native kernel environment, i.e., non-paged pool usage or number of free page descriptors.

Figure 2:
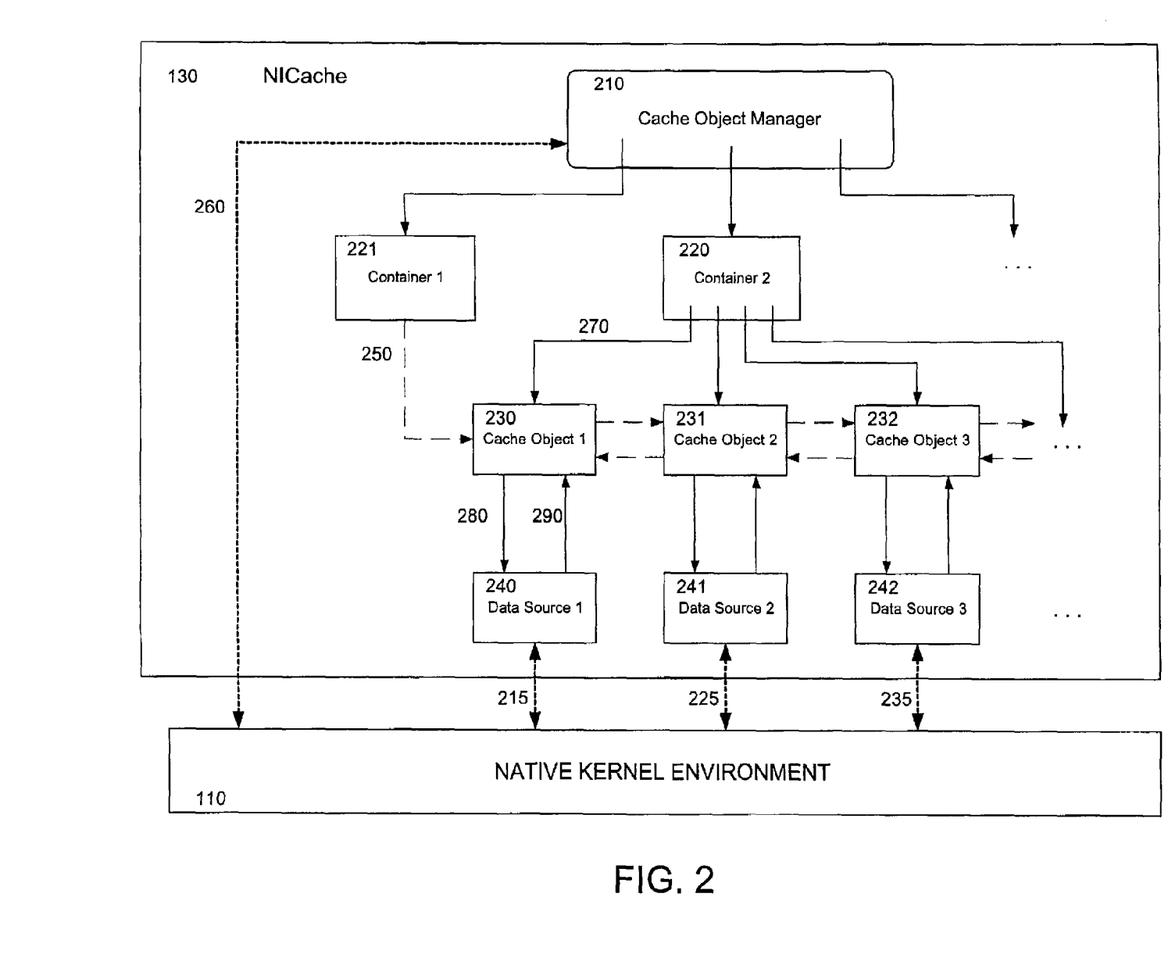
FIG. 2 is an instance diagram showing different instantiated objects and their references.

Cached content is the data that NICache is caching on behalf of applications. More specifically, it is the data required by the application to be stored in a system in which the data is easy to retrieve. This data can be in any format, such as ASCII or binary, generated from any source. The limitations on cached content are that of the native kernel environment. Each piece of data is determined by its source. The source could include the output from a user-level program, a response to an HTTP GET request, or the contents of a local or remote file. Cache content is stored in cache objects 230, 231, 232. Cache objects are the structures and procedures for storing or caching the required data using specific kernel mechanisms. These mechanisms may include the file system cache, pinned memory, or pageable memory and represent various cache object types or classes. Each cache object may be associated with a descriptor or search key possibly provided by the application.

To maintain and locate the cache content, the cache object manager 210 utilizes any number of container data structures 220. These containers preferably hold references to the cache objects 230 in a manner that is specific to each container. For example, containers could include a linked list 221, a hash table 220, a binary tree, or an array. The linked list container 221 preferably has a reference 250 to the head cache object of a doubly linked list. The hash table container 220 holds references 270 to all cache objects stored in the hash table. A reference to each cache object must be stored in at least one container. The cache object manager 210 preferably has sole discretion as to which containers hold which cache objects. Other containers may be used for sorting cache objects based on the source of the data, the amount of certain system resources used, or other criteria.

Each cache object is preferably associated with a single data source. The data source, which will be described later in more detail, describes where the cache object's data originated from. The data sources communicate 215, 225, 235 with the native kernel environment 110 on behalf of the cache object. To locate its data source 240, 241, 242, each cache object 230, 231, 232 preferably maintains a reference 280 to the data source. Likewise, the data source preferably possesses a reference 290 back to the cache object.

Preferably, NICache 130 supports any number of cache objects of any type, simultaneously. Furthermore, NICache 130 may support data from many sources simultaneously. Any type of cache object can be populated from any source. For example, a cache object storing its content in pinned memory could receive the content from a local file or perhaps from an HTTP response. To clarify, the cache object stores cached content. The data's source identifies where that content came from and is configured for retrieving the content. Each cache object is associated with a single data source and vice versa. There are preferably no restrictions on which types of cache objects can be paired with which type of data sources and vice versa.

Figure 3:
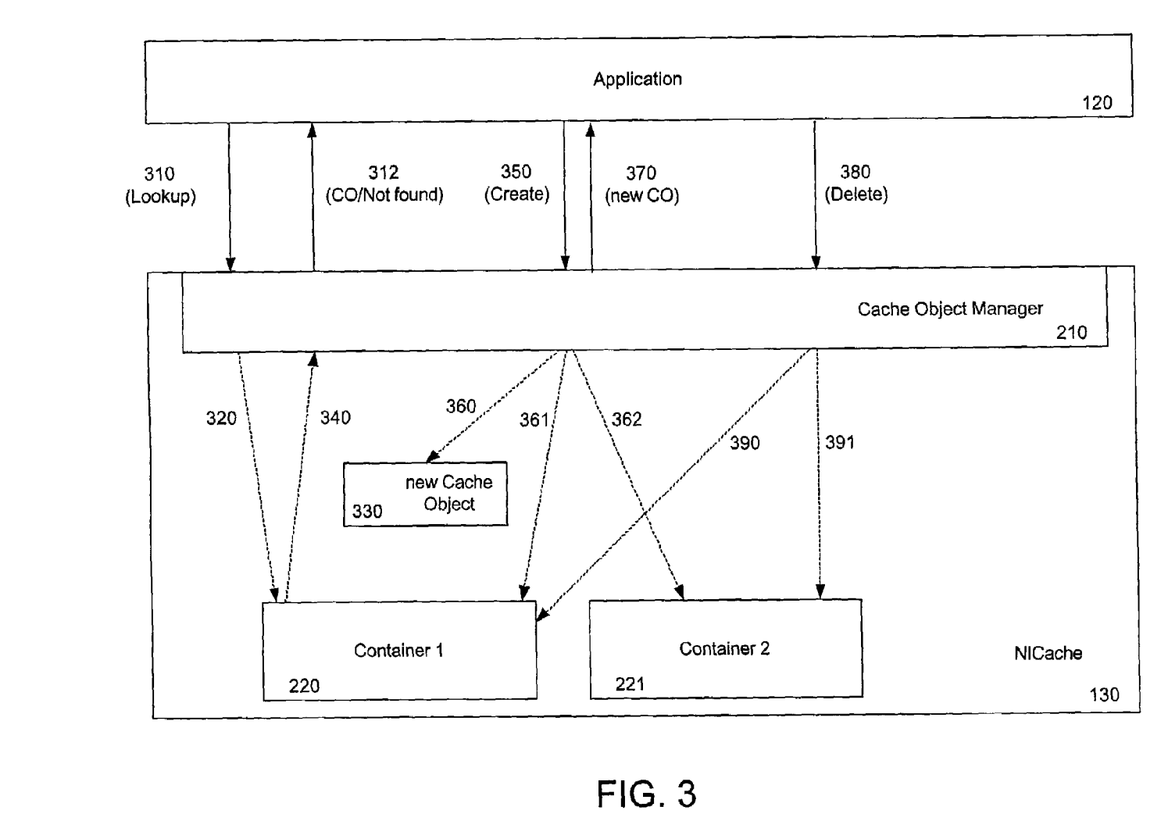
FIG. 3 is a block diagram which illustrates interaction between various modules and objects.

Turning to FIG. 3, NICache 130 may typically react to requests from one or more applications 120. Being a cache, NICache 130 responds to Lookup/Find 310, Store/Create 350, and Remove/Delete 380 requests. All requests for cache object operations, such as the aforementioned requests, are made preferably into the cache object manager 210. The cache object manager 210 preferably manages all cache objects and thus handles all external requests. When an application 120 has data to be cached, it preferably issues a create command to NICache 130, passing it a reference to a data source (though not the data). Based on fields within the data source, information gathered 260 about the current state of the system and the current state of NICache, the cache object manager 210 preferably decides which storage mechanism to use to store the data (i.e. the type of cache object to use). After the cache object type is determined, a cache object 330 of that type is preferably created 360, and a reference to that cache object is stored 361, 362 in one or more appropriate containers 220, 221. A reference to the newly created cache object is returned 370 to the application 120.

Conversely, when the application 120 aims to remove content from the cache, it preferably makes a call to NICache 130 to delete 380 a cache object passing in a reference to the cache object to be removed. The cache object manager 210 handles the request 380 from the application 120 by invoking the remove procedure 390, 391 on any containers 220, 221 that contain a reference to the cache object and then by issuing a delete command to the cache object 330. The cache object will preferably clean up any volatile and possibly nonvolatile storage it was using to store the cached content. Upon completion of these tasks, the cache object manager 210 preferably deletes all volatile storage used by the cache object data structure itself.

When data stored in the cache NICache 130 is needed by the application, a lookup request 310 is preferably made for the cache object based on an identifier. In an exemplary embodiment of the present invention, this identifier includes an HTTP Universal Resource Identifier (URI) (Berners-Lee, T., et al., *RFC* 1945, 1996, http colon backslash backslash www dot ietf dot org backslash rfc backslash rfc1945 dot txt). If the cache object is in at least one of NICache's containers, then it is returned 312 to the application 120. Also included in this embodiment is the notion of a "fast search container"—that is a container in which lookups on the identifier are done in constant time and the cache object manager knows how to locate this container. A preferred implementation of NICache uses a hash table 220 for this purpose. Of course, the cache object manager issues a lookup call 320 to this fast container to find the data stored under the identifier. Once located, the container returns 340 the cache object to the cache object manger 210, which in turn returns 330 the cache object (or not found) to the application. These actions could take place synchronously or asynchronously.

A preferred implementation of NICache 130 includes a linked list container 221 as one of two containers 221, 220. This linked list is preferably sorted using a weighted Least Recently Used (LRU) algorithm. Each time a cache object is returned as a result of a lookup request 310, the cache object is preferably moved to the head of the linked list. This insures that the least recently accessed cache objects are towards the tail of the list. This information becomes useful when cache objects must be removed from the cache, such as in a resource constrained environment.

Figure 4:
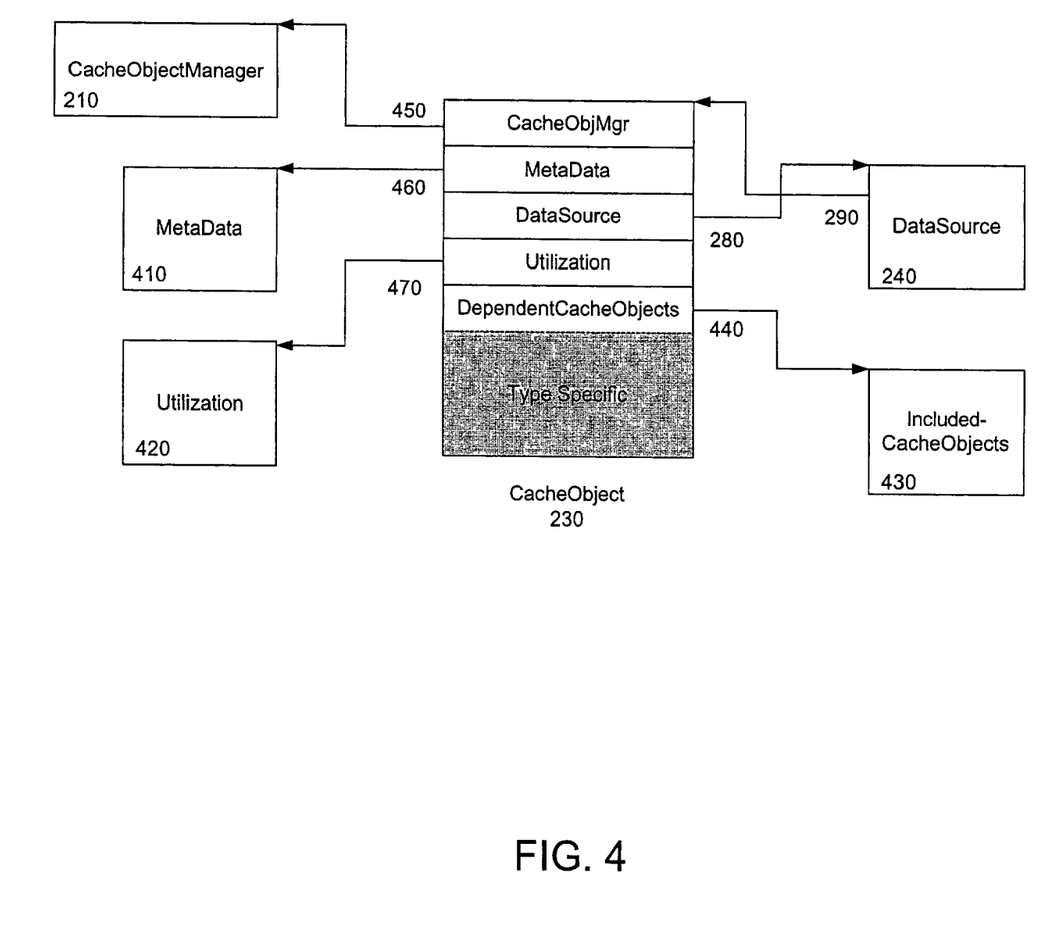
FIG. 4 is a graphical diagram illustrating memory layout and references for cache objects.
Figure 5:
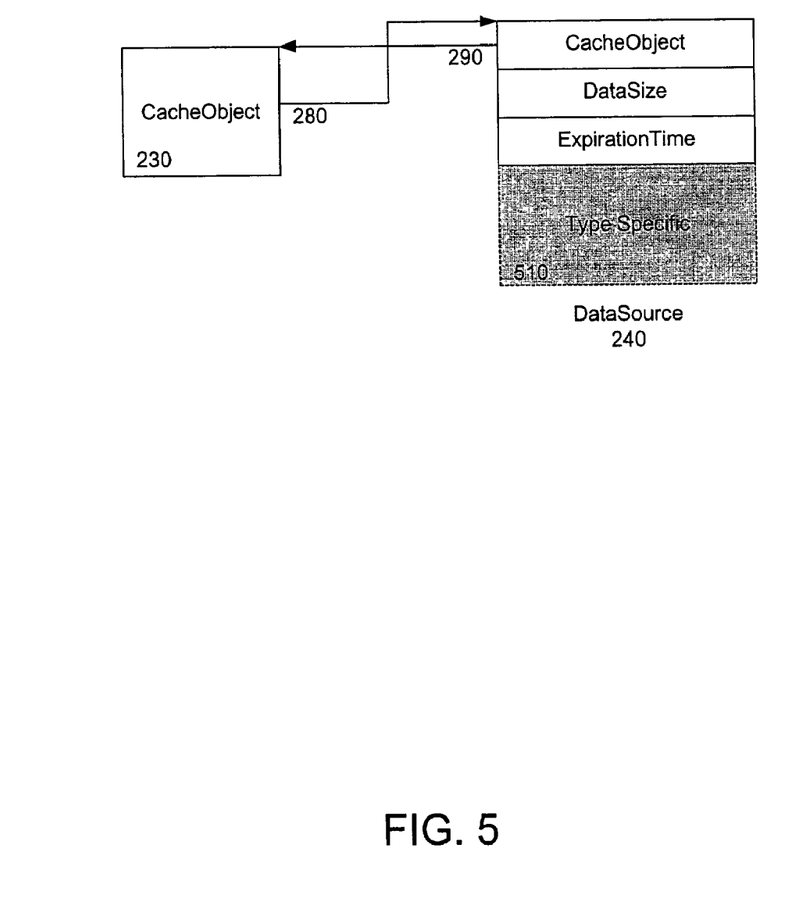
FIG. 5 is a graphical diagram illustrating memory layout and references for data sources.

Many different classes of cache objects lead to many disparate implementations of cache objects; however, all cache objects are generally required to have certain pieces. Turning now to FIGS. 4 and 5, a reference 450 to a cache object manager 210 is preferably maintained in case the cache object needs to inform the cache object manager that the source of the data has been removed thus the cache object itself must be removed. A meta data structure 410 will preferably possess information that describes this cache object. Information required to generate network protocol headers would be found here. Every cache object preferably contains a reference 460 to a single meta data. Likewise, each cache object preferably maintains a reference 470 to a utilization 420, which describes the system resource utilization of its corresponding cache object 230. Cache objects preferably contain a reference 440 to a list of included cache objects 430. When the data for a cache object is requested of by the application, the data from the included cache objects is returned in addition to the original cache object's data. The included cache objects structure 430 may contain rules, such as ordering, for sending included cache object's data. The type-specific portion 430 of the cache object will preferably contain any and all data and references used by a cache object to maintain cached content in a type-defined way. Data sources 240 may maintain references 290 to their individual cache objects 230 and vice versa 280. FIGS. 4 and 5 show this association.

In addition to the reference 290 to the cache object, every data source preferably holds the size of the data (if any), and the time the data expires (if any). Information specific to the source of the data and how to retrieve content from the source is preferably contained in the type-specific 510 portion of the data source 240.

Figure 6:
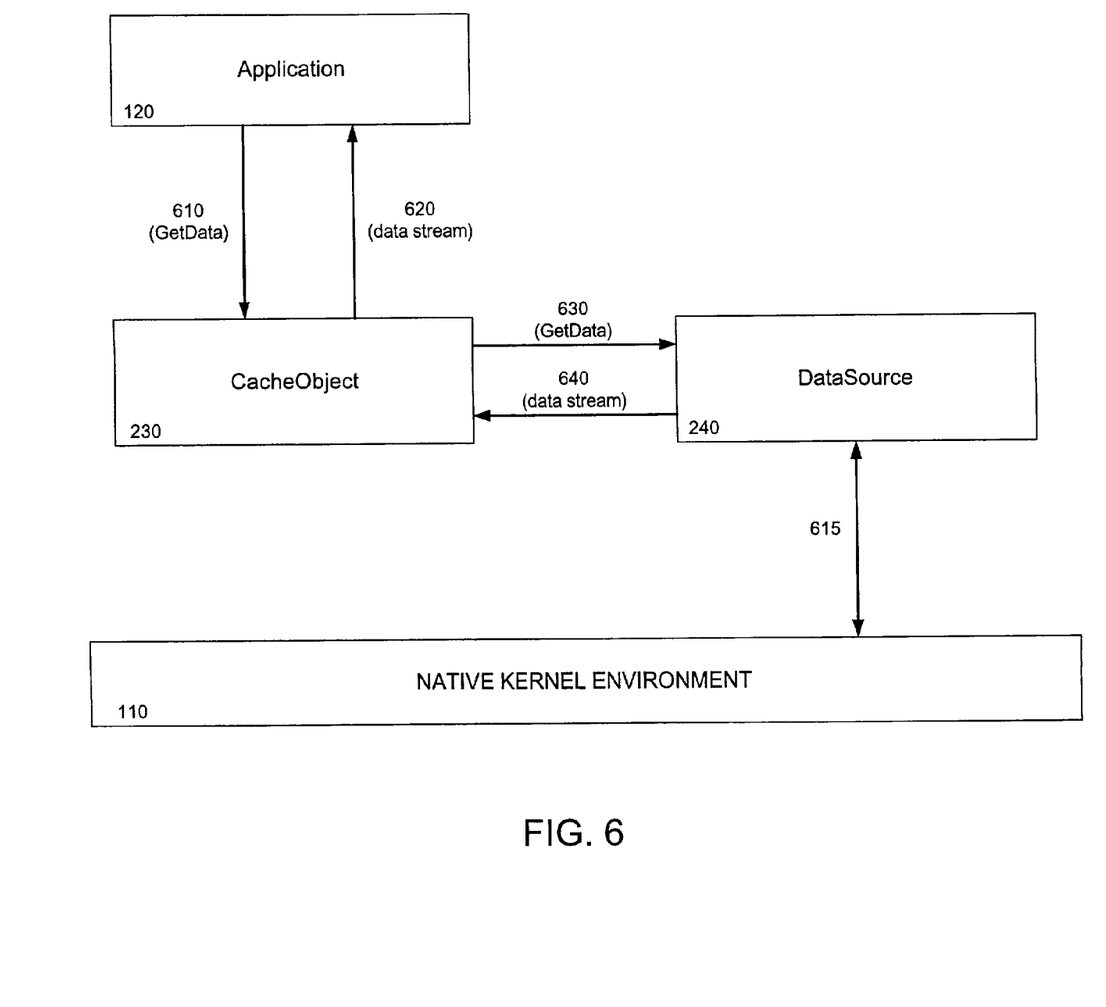
FIG. 6 is a block diagram which illustrates communication between objects and modules relating to a request for data.

Turning to FIG. 6, when an application 120 intends to extract information from a cache object 230, it will preferably issue a request 610, optionally including an offset and length, for the data. In a presently preferred implementation of NICache, the application will only issue such a request 610 when the content is needed in order to send to a client. In addition, the cache object will not pre fill the contents. Therefore, when a request 610 for data is made into the cache object, the data may not be present (i.e., stored within the cache object). If the data is present, then the cache object returns 620 the content immediately. Based on the rules in the cache object's included cache object's structure 430, the cache object may then forward the request 620 to included cache objects. If the content is not present in the cache object, then the call 610 returns with a pending status code, and the cache object makes a call 630, optionally including an offset and length, to its data source requesting the data. When the data source already has the requested information from the source, then the request 630 is returned immediately, which in turn passes 620 the data back to the application 120. There are instances, however, where the data source must contact 615 the source of the data via kernel mechanisms to get a recent copy of the data. In this case, the cache object's call 630 is returned with a pending status code, while the data source waits for the source to return the data. Once the data source receives some or all the content required by the cache object, the cache object is called back 640 with the data, which causes the cache object to return 620 the data to the application 120. The cache object callback 640 may be called more than once for a single request 630 into the data source. This double layered asynchronous interface prevents the application and cache object from waiting. This permits the application 120 to submit a request for the data 610 at interrupt level or elevated interrupt request levels (IRQLs).

Figure 7:
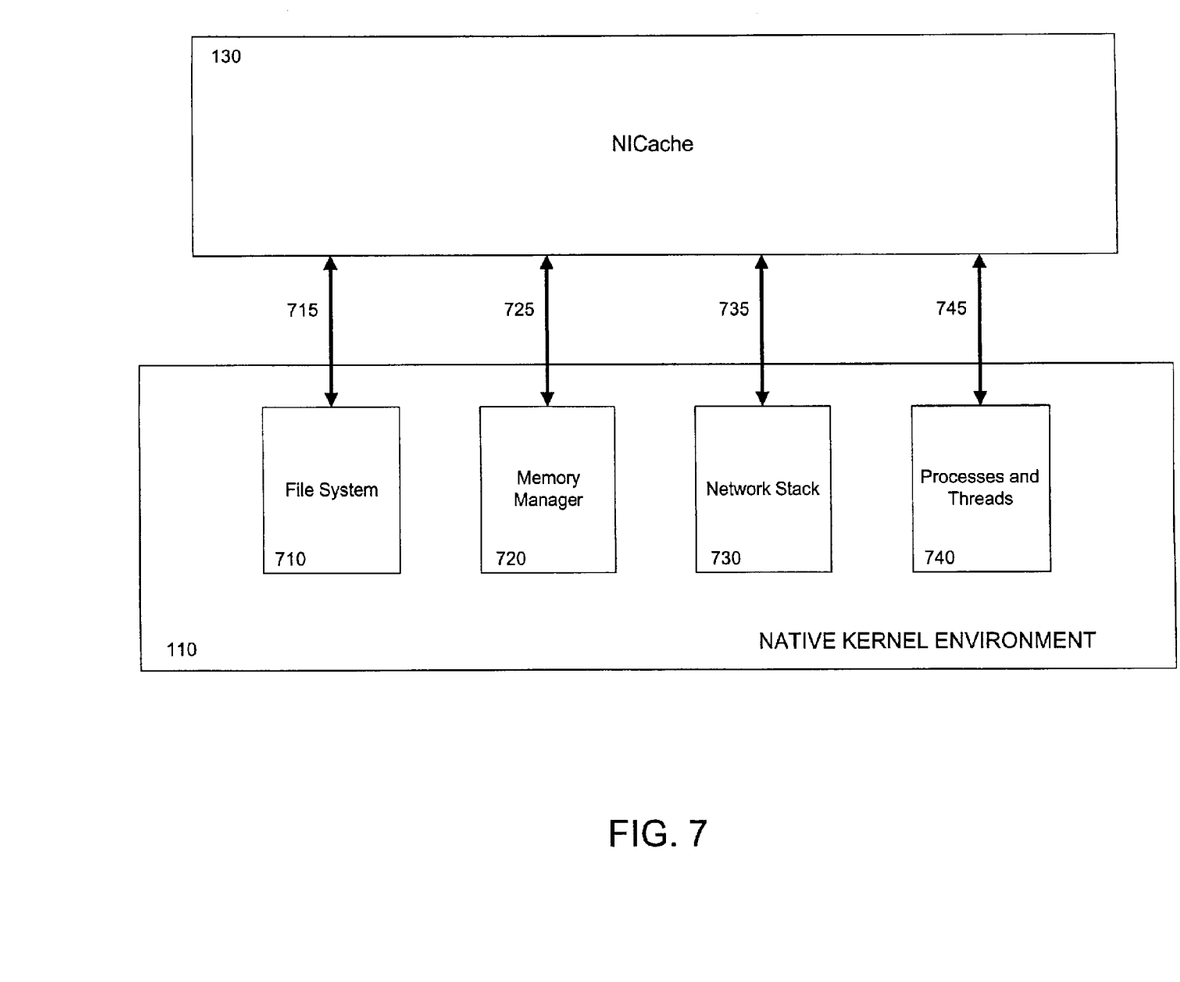
FIG. 7 is a block diagram illustrating various kernel components.

As mentioned previously, the data source communicates with the native kernel environment 110 to obtain a recent copy of the data as depicted by item 615. FIG. 7 focuses in on different sub-components that may be found in a native kernel environment 110. Though the names and potential groupings vary between operating systems, these components all characteristically exist in commercial operating systems such as AIX, Linux, and Windows. Many of these components may potentially be employed by NICache.

Figure 8:
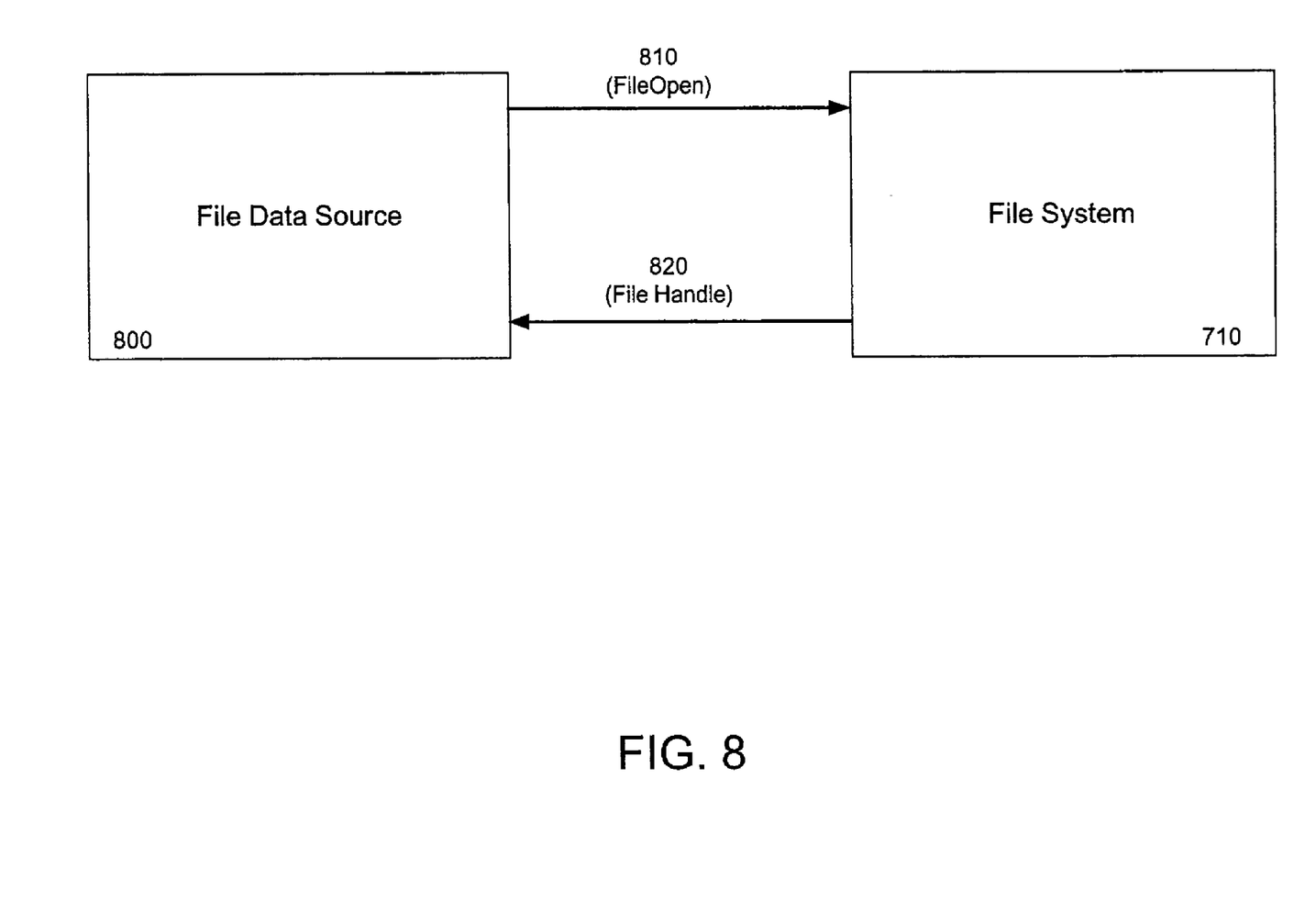
FIG. 8 is a block diagram which illustrates communication between a file data source and its associated kernel component.

The file system 710 is the part of the operating system that deals with the transfer of data to and from nonvolatile storage. This storage could be physical or logical disk drives located in the same physical machine or located across the network. The data from these files can be used to populate cache objects. NICache data sources can use the file system API for communication 715 to create files, open files, retrieve file handles, read data, and write data. FIG. 8 shows how a file data source 800 in an exemplary embodiment issues an file open request 810 to the file system 710, and a file handle 820 is returned.

The memory manager 720 is a set of system services responsible for allocating, deallocating, and managing virtual memory, resolving hardware memory exceptions, and governing the page table (see Solomon and Russinovich, supra, p. 380). A data source may need to allocate 725 memory (pinned memory, non-paged pool, etc.) or access shared memory in order to satisfy a cache object's Get Data request 630.

Figure 9:
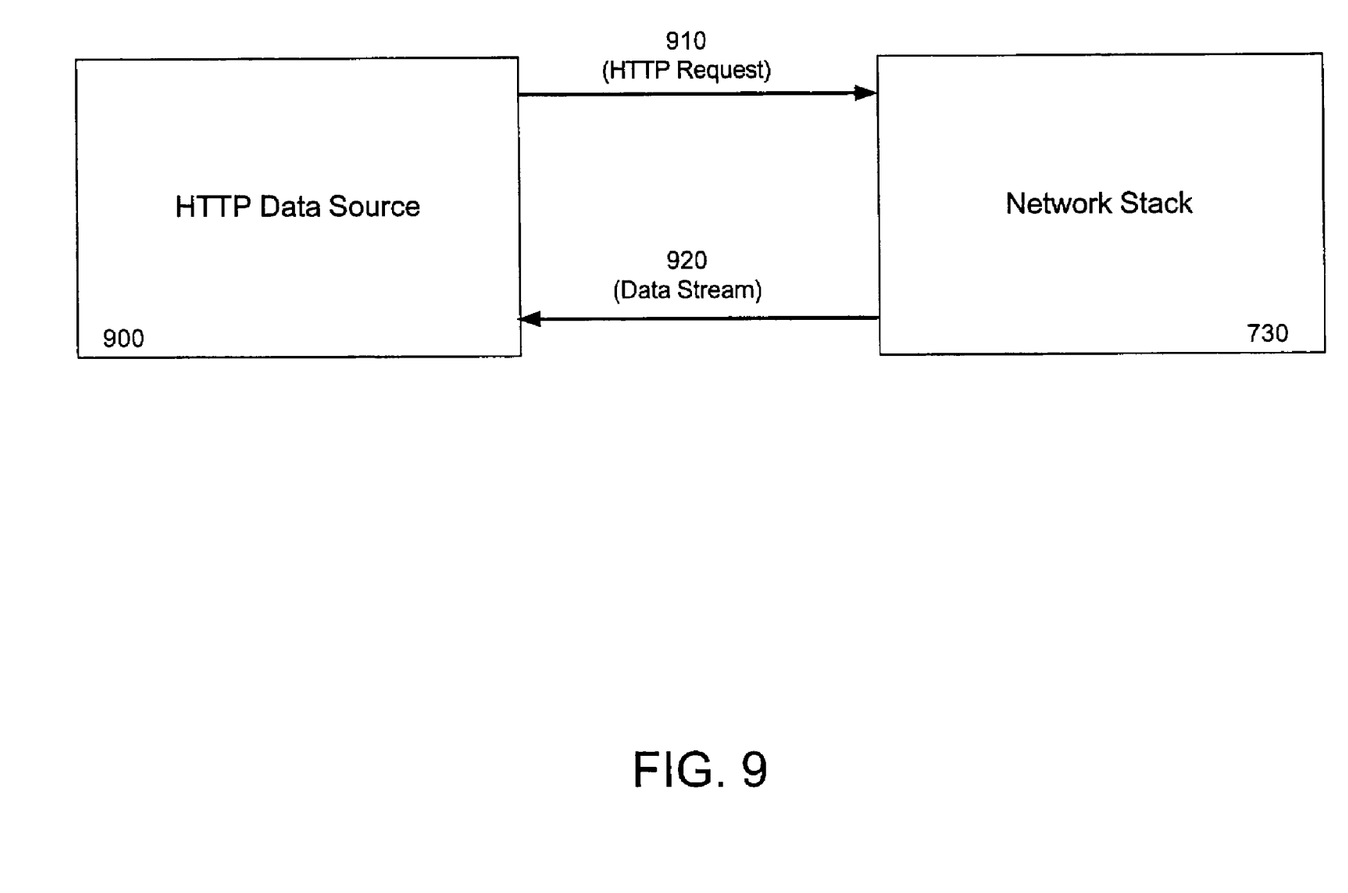
FIG. 9 is a block diagram which illustrates communication between an HTTP data source and its associated kernel component.

A kernel's network stack 730 typically sends and receives data over a network, as explained in detail by W. Richard Stevens, TCP/IP Illustrated, Volume 1 The Protocols Addison-Wesley, 1994. A data source may obtain its data from interaction 735 with the network stack 730. FIG. 9 shows an exemplary embodiment of NICache in which an HTTP data source 900 utilizes the kernel's network stack 730 to send HTTP requests 910 (see Berners-Lee, T., et al., *RFC* 1945, 1996, http colon backslash backslash www dot ietf dot org backslash rfc backslash rfc1945 dot txt) to an HTTP server. The response to these HTTP requests, in the form of a data stream 920, is routed back to the HTTP data source 900. A variety of data sources could be constructed based on other network protocols requiring the use of the network stack 730.

Processes and threads 740 refer to any program running on the same machine as NICache but in a different context. A data source could communicate 745 with another process or thread via inter-process communication mechanism provided by the native kernel environment 110.

Figure 10:
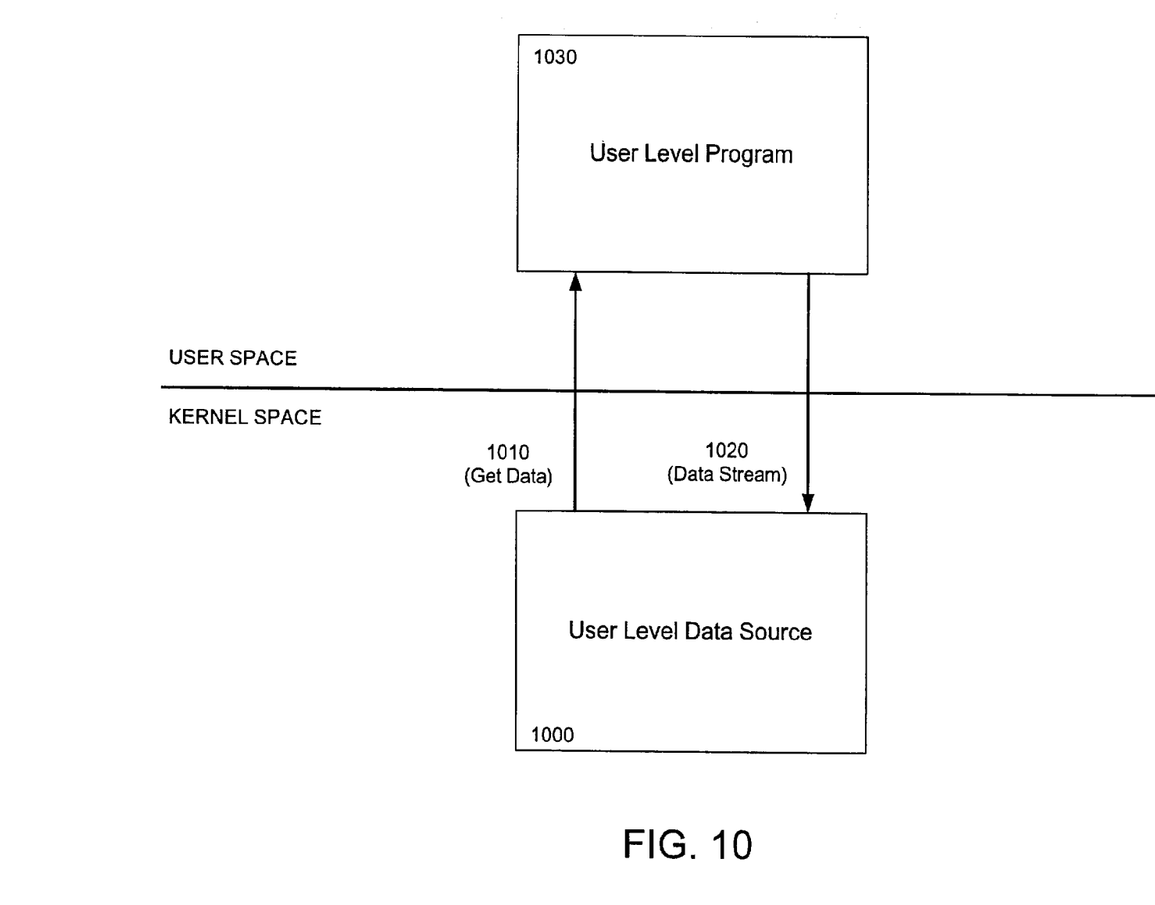
FIG. 10 is a block diagram which illustrates communication between user space and kernel space.

FIG. 10 shows a class of data source, a User Level Data Source 1000 in an exemplary embodiment, interacting with another program or thread of execution 1030. The request for the data 1010 and the response containing the data 1020 are communicated via kernel mechanisms for inter process communication, including sockets, streams, shared memory, signals, or pipes.

It is to be understood that the present invention, in accordance with at least one presently preferred embodiment, includes an arrangement for creating at least one cache object for storing cached content in a kernel environment, at least one arrangement for looking up at least one cache object, and an arrangement for collecting data from a plurality of data sources and populating at least one cache object with the collected data. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer system for caching application data in the kernel environment of an operating system, said system comprising:

an arrangement for creating at least one cache object for storing cached content in the kernel environment wherein the cache object is referenced in one or more determined cache containers;

at least one arrangement for looking up at least one cache object referenced in one or more determined cache containers; and an arrangement for collecting data from a plurality of data sources and populating at least one looked up or created cache object with the collected data;

wherein at least one cache object is adapted to employ at least one storage mechanism specific to the operating system based on the fields of the data source and information regarding the state of the system.

2. The system of claim 1, wherein at least one storage mechanism corresponds to at least one of: an independent cache object type and an independent cache object classification.

3. The system of claim 1, wherein at least one cache object is exclusively managed and controlled by said system.

4. The system of claim 3, further comprising an arrangement for adapting the handling of at least one cache object to the specific operating system environment.

5. The system of claim 4, wherein said arrangement for adapting the handling of at least one cache object is configured for adapting the handling of at least one cache object based on at least one the following: amount of pageable memory used; amount of pageable memory free for use; amount of total pageable memory in the system; amount of total pageable memory in the kernel; amount of non-pageable memory used; amount of non-pageable memory free for use; amount of total non-pageable memory in the system; amount of total non-pageable memory in the kernel; number of system page table entries used; number of system page table entries available for use; amount of virtual memory allocated to the system page table; size of the system cache; amount of space available in the system cache; amount of space used in the system cache; size of a system working set; number of system buffers in use; number of system buffers available; number of system buffers; page sizes; number of network connections established; utilization of one or more central processing units (CPUs); number of worker threads allocated; number of worker threads idle; number of busy worker threads; number of cache objects allocated; percent CPU time spent in kernel; number of system interrupts per time unit; number of page faults per unit time; number of page faults in the system cache per unit time; number of paged pool allocations per unit time; number of non-paged pool allocations per unit time; length of look-aside lists; number of open file descriptors; amount of free space on the disk or disks; and percent of time spent at interrupt level, otherwise known as elevated interrupt request levels.

6. The system of claim 1, wherein said one or more determined cache containers comprises at least one data structure.

7. The system of claim 6, wherein said at least one data structure is controlled by said system.

8. The system of claim 7, wherein said at least one data structure comprises at least one of: at least one hash table, at least one linked list, at least one tree, at least one heap, and at least one queue.

9. The system of claim 1, further comprising volatile storage which stores derails relating to the plurality of data sources.

10. The system of claim 9, wherein the at least one cache object is adapted to maintain coherency with the plurality of data sources using the stored details of the plurality of data sources.

11. The system of claim 1, wherein any classification of the at least one cache object is associated with a single instance of any classification of the plurality of data sources.

12. The system of claim 11 wherein any arrangement for storing data from the plurality of data sources is independent of any arrangement for storing details relating to the plurality of data sources.

13. The system of claim 12, wherein the plurality of data sources are independent of the at least one cache object.

14. The system of claim 1, wherein the data from the plurality of data sources is application-specific.

15. The system of claim 1, wherein the data from the plurality of data sources is application-independent.

16. The system of claim 1, further comprising an arrangement for deleting at least one cache object.

17. The system of claim 1, further comprising an arrangement for permitting data from the plurality of data sources to be sent to a client application during population of the at least one cache object.

18. The system of claim 1, wherein to a client application undertakes at least one of: any necessary parsing of request parameters; generating any necessary application-specific response data beyond any provided by the plurality of data sources; selecting the type of at least one data; and creating the plurality of data sources.

19. The system of claim 1, wherein the plurality of data sources comprise at least one of: file systems; HTTP servers; and user-level applications.

20. The system of claim 1, further comprising an arrangement for returning cached content upon request.

21. The system of claim 20, wherein said arrangement for returning cached content is adapted to return the data of at least one cache object upon request.

22. The system of claim 20, wherein said arrangement for returning cached content is adapted to employ a cache object to return the data of at least one included cache object.

23. A method of caching application data in the kernel environment of an operating system said method comprising the steps of:
    creating at least one cache object for storing cached content in the kernel environment wherein the cache object is referenced in one or more determined cache containers;
    looking up at least one cache object referenced in one or more determined cache containers; and
    collecting data from plurality of data sources and populating at least one looked up or created cache object with the collected data;
    wherein said creating step comprises creating at least one cache object adapted to employ at least one storage mechanism specific to the operating system based on the fields of the data source and information regarding the state of the system.

24. The method of claim 23, wherein at least one storage mechanism corresponds to at least one of: an independent cache object type and an independent cache object classification.

25. The method of claim 23, wherein at least one cache object is exclusively managed and controlled by said system.

26. The method of claim 25, further comprising the step of adapting the handling of at least one cache object to the specific operating system environment.

27. The method of claim 26, wherein said step of adapting the handling of at least one cache object comprises adapting the handling of at least one cache object based on at least one the following: amount of pageable memory used; amount of pageable memory free for use; amount of total pageable memory in the system; amount of total pageable memory in the kernel; amount of non-pageable memory used; amount of non-pageable memory free for use; amount of total non-pageable memory in the system; amount of total non-pageable memory in the kernel; number of system page table entries used; number of system page table entries available for use; amount of virtual memory allocated to the system page table; size of the system cache; amount of space available in the system cache: amount of space used in the system cache; size of a system working set; number of system buffers in use; number of system buffers available; number of system buffers; page sizes; number of network connections established; utilization of one or more central processing units (CPUs); number of worker threads allocated; number of worker threads idle; number of busy worker threads; number of cache objects allocated; percent CPU time spent in kernel; number of system interrupts per time unit; number of page faults per unit time; number of page faults in the system cache per unit time; number of paged pool allocations per unit time; number of non-paged pool allocations per unit time; length of look-aside lists; number of open file descriptors; amount of free space on the disk or disks; and percent of time spent at interrupt level, otherwise known as elevated interrupt request levels.

28. The method of claim 23, further comprising:
    providing at least one data structure;
    wherein said one or more determined cache containers comprises looking up at least one cache object with said at least one data structure.

29. The method of claim 28, wherein said at least one data structure is controlled by said system.

30. The method of claim 29, wherein said at least one data structure comprises at least one of: at least one hash table, at least one linked list, at least one tree, at least one heap, and at least one queue.

31. The method of claim 23, further comprising the step of providing volatile storage for storing details relating to the plurality of data sources.

32. The method of claim 31, wherein the at least one cache object maintains coherency with the plurality of data sources using the stored details of the plurality of data sources.

33. The method of claim 23, wherein any classification of the at least one cache object is associated with a single instance of any classification of the plurality of data sources.

34. The method of claim 33, wherein any arrangement for storing data from the plurality of data sources is independent of any arrangement for storing details relating to the plurality of data sources.

35. The method of claim 34, wherein the plurality of data sources are independent of the at least one cache object.

36. The method of claim 23, wherein the data from the plurality of data sources is application-specific.

37. The method of claim 23, wherein the data from the plurality of data sources is application-independent.

38. The method of claim 23, further comprising the step of providing an arrangement for deleting at least one cache object.

39. The method of claim 23, further comprising the step of permitting data from the plurality of data sources to be sent to a client application during population of the at least one cache object.

40. The method of claim 23, wherein to a client application undertakes at least one of: any necessary parsing of request parameters; generating any necessary application-specific response data beyond any provided by the plurality of data sources; selecting the type of at least one data; and creating the plurality of data sources.

41. The method of claim 23, wherein the plurality of data sources comprise at least one of: file systems; HTTP servers; and user-level applications.

42. The method of claim 23, further comprising the step of returning cached content upon request.

43. The method of claim 42, wherein said step of returning cached content comprises returning the data of at least one cache object upon request.

44. The method of claim 42, wherein said step of returning cached content comprises employing a cache object to return the data of at least one included cache object.

45. A program storage device readable by machine, tangibly embodying a program of instructions executable by the machine to perform method steps for caching application data in the kernel environment of an operating system, said method comprising the steps of:

creating at least one cache object for storing cached content in the kernel environment wherein the cache object is referenced in one or more determined cache containers;

looking up at least one cache object referenced in one or more determined cache containers; and collecting data from plurality of data sources and populating at least one looked up or created cache object with the collected data;

wherein said creating step comprises creating at least one cache object adapted to employ at least one storage mechanism specific to the operating system based on the fields of the data source and information regarding the state of the system.

* * * * *

UNITED STATES PATENT AND TRADEMARK OFFICE
CERTIFICATE OF CORRECTION

PATENT NO. : 7,155,571 B2
APPLICATION NO. : 10/260803
DATED : December 26, 2006
INVENTOR(S) : LaVoie et al.

It is certified that error appears in the above-identified patent and that said Letters Patent is hereby corrected as shown below:

Column 10, Line 30 "cache;" should be --cache:--

Signed and Sealed this

Eighth Day of May, 2007

JON W. DUDAS
*Director of the United States Patent and Trademark Office*